May 11, 1937.    J. FREI, JR    2,080,259
LIGHT TRANSMITTING MEANS
Filed Aug. 6, 1936
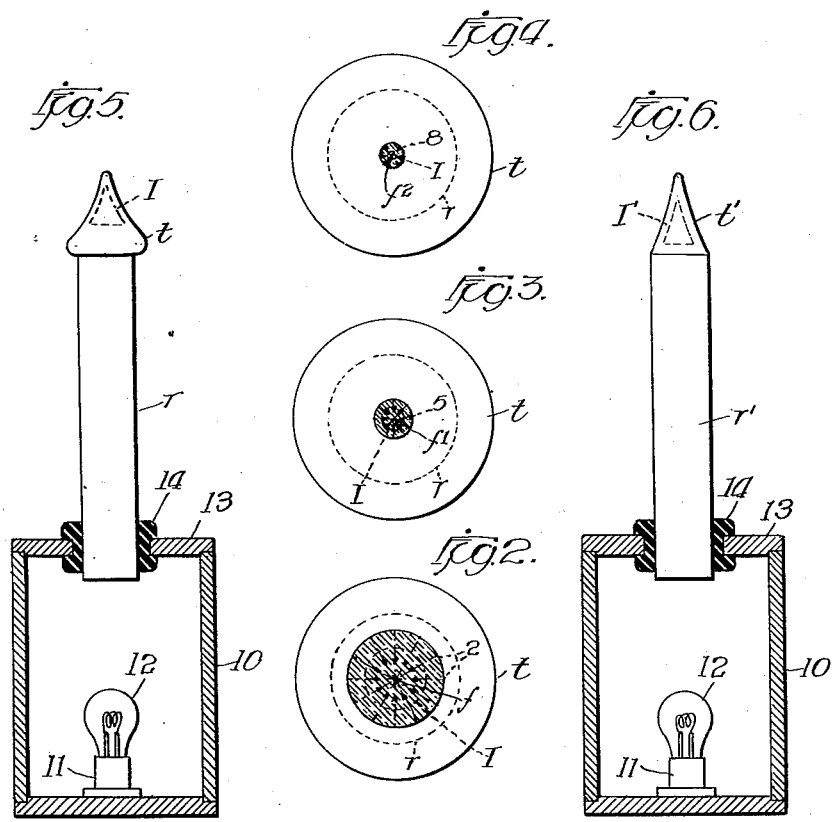
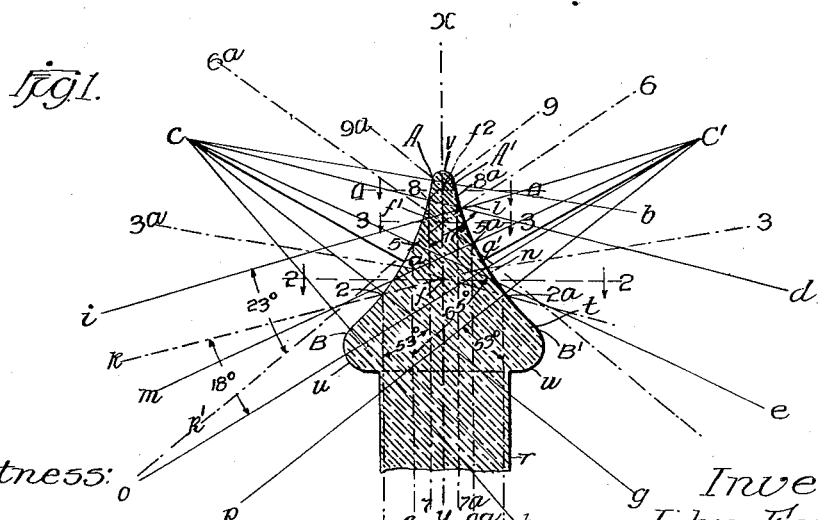
Witness:
Harry R. L. White
Inventor:
John Frei Jr.
By Brown, Jackson, Boettcher & Dienner
Atty's Patented May 11, 1937

2,080,259

UNITED STATES PATENT OFFICE 2,080,259

LIGHT TRANSMITTING MEANS

John Frei, Jr., Chicago, Ill.

Application August 6, 1936, Serial No. 94,599

3 Claims. (Cl. 240—10)

This invention relates to light transmitting means, and has to do with illuminating objects by light transmitted through glass rods or analogous means.

My invention is directed particularly to the production of artificial candles and analogous devices which produce a novel and pleasing appearance though, in its broader aspects, it is capable of many other applications. One of the main objects of my invention is to provide what I term an artificial candle formed of glass or other suitable light transmitting material and so constructed that, when illuminated, it simulates a candle in appearance. In referring to the term "illuminated" herein I wish it to be understood that the term defines the apparent illumination obtained within the tip due to the effect of looking through a convex lens produced by the rounded section of glass facing the observer, which appears to cause the illuminated or reflecting rear surface of the tip to appear located within the central axis of the tip. More specifically, my invention is directed to an article comprising a glass rod and an element at one end thereof, so formed and disposed as to receive light rays transmitted through the rod and to reflect these rays internally and concentrate them in such manner that the interior of the element at the end of the rod is illuminated to a greater extent than the remainder of the element, and in such manner as to produce an area within the element which is illuminated at a relatively high degree of illumination and which conforms substantially in shape to the exterior surface of the element, being spaced inwardly from such surface, thus producing within the terminal element an illuminated substantial image thereof. Further objects and advantages of my invention will appear from the detail description.

In the drawing:—

Figure 1 is an axial sectional view through the upper portion of an article embodying my invention, the rod being broken off;

Figures 2, 3 and 4 are sectional views taken substantially in the planes of lines 2—2, 3—3 and 4—4, respectively, of Figure 1;

Figure 5 is an elevational view of an article embodying my invention applied to a housing containing a light source, the housing being shown in section; and Figure 6 is a view similar to Figure 5, showing a modified form of an article embodying my invention.

Referring to Figure 1 of the drawing, the specific embodiment of my invention illustrated, by way of example, comprises a glass rod $r$ provided at its upper with an integral tip member $t$ of substantially conical cross section, this member and the rod being coaxial, as indicated by the line $x$—$y$ which coincides with the common axis of rod $r$ and tip member $t$. The rod $r$ and the tip member $t$ are formed of commercial crown glass the critical angle of which is approximately 43°

Tip member $t$ is of substantially conical shape and is concaved for the major portion of its length. Considering the opposite sides of this tip member, one side thereof is curved on an arc AB of regular curvature having the radius $Ca$, and the opposite side thereof is curved on a similar arc A'B' having the radius $C'a'$ of the same length as radius $Ca$. The lower ends of the arcs are connected to the rod $r$ by short arcs $u$ and the upper ends of the arcs AB and A'B' are connected by an arc $v$ of semi-circular extent. The radius of the arcs AB and A'B' is such that light rays entering element $t$ from rod $r$, in a direction parallel to the axis $x$—$y$ and falling upon the surfaces of the arcs, will have an angle to the normal greater than the critical angle of crown glass, that is, greater than approximately 43°, and will be totally reflected within the tip or terminal element $t$. Considering the ray 1—2, it will be noted that this ray forms an angle of approximately 53° with the normal $Cg$, a secondary axis of the arc AB. Accordingly, the light ray 1—2 is totally reflected from its point of incidence to the surface or arc AB and, if continued, will fall upon the surface or arc A'B' at the opposite side of element $t$, the angle of incidence at this surface being but approximately 18°, as indicated by the angle $k$—$n$—$o$, $C'o$ being the normal and a secondary axis of the arc A'B'. Accordingly, the reflected ray 2—3 will pass out of the element $t$ at point $n$, if continued, and will be bent or deflected downward through a slight angle. In like manner the light ray 4—5 will be totally reflected from surface AB, at point 5, the angle of incidence 4—5—$e$ being approximately 65°, $Ce$ being a secondary axis of the arc AB. The angle of incidence of the reflected ray 5—6, if continued to surface A'B', is less than the critical angle and this ray will pass out of the element $t$ into the surrounding atmosphere, being bent or deflected downward through a slight angle. The angle of incidence of the reflected ray 5—6, designated $i$—$l$—$k^1$, is approximately 23°, $C'i$ being the normal and a secondary axis of the surface or arc A'B'. The angle of incidence 7—8—$d$, $Cd$ being the normal and a secondary axis of the arc AB, is approximately 77° and ray 7—8 is totally reflected from its point of incidence 8, the reflected ray passing through element $t$ to the opposite side thereof and thence into the atmosphere, this reflected ray 8—9 being bent downward through a slight angle as it leaves element $t$.

The light rays so far considered are all at one side of the axis $x$—$y$ and are all totally reflected from the arcuate surface AB. Light rays $1a$—$2a$, $4a$—$5a$ and $7a$—$8a$, at the other side of axis $x$—$y$ and spaced therefrom correspondingly to the light rays $1$—$2$, $4$—$5$ and $7$—$8$, respectively, will be totally reflected in the same manner as the latter rays, the reflected rays, if continued, being designated $2a$—$3a$, $5a$—$6a$, and $8a$—$9a$.

It will be noted that the reflected rays $2$—$3$ and $2a$—$3a$ intersect at a point $f$ on the axis $x$—$y$, the reflected rays $5$—$6$ and $5a$—$6a$ intersect at point $f^1$ on the axis $x$—$y$, and the reflected rays $8$—$9$ and $8a$—$9a$ intersect at a point $f^2$ on the axis $x$—$y$. Accordingly, all of the light rays entering element $t$ from rod $r$, parallel to the axis $x$—$y$ and falling upon the curved surface of element $t$, in a plane normal to axis $x$—$y$ and passing through points $2$ and $2a$, will be focused at a point $f$ on axis $x$—$y$. Similarly, all light rays parallel to axis $x$—$y$ falling upon the curved surface of element $t$, in a plane normal to axis $x$—$y$ and passing through points $5$ and $5a$, will be focused on the axis at the point $f^1$. In like manner, all light rays parallel to axis $x$—$y$ falling upon the curved surface of element $t$, in a plane passing through points $8$ and $8a$ normal to axis $x$—$y$, will be focused at point $f^2$ on the axis. Possibly the rays may not be brought to a sharp focus, due to aberration or other causes, but, in general, the light rays throughout the entire circumference of element $t$, in a given plane normal to the axis $x$—$y$, will be focused on this axis.

Since element $t$ decreases upward in diameter, the amount of light focused at $f$ will be greater than the amount focused at $f^1$, which, in turn, will be greater than the amount of light focused at $f^2$. In general, the amount of light focused on axis $x$—$y$ decreases uniformly toward the upper end or tip of element $t$. The light focused at $f$ will illuminate the interior of element $t$ for a considerable area thereof but, since the intensity of light varies inversely as the square of the distance, this illumination rapidly decreases outward so that there is relatively little interior illumination of element $t$, a short distance from the outer surface thereof, by the light focused at $f$, which focused light may be considered as a light source. There is thus produced within element $t$, at the point $f$ and extending outward therefrom an appreciable distance, a well defined zone or area which is illuminated with relatively great brilliancy and is clearly defined and spaced inwardly from the outer face of element $t$. In like manner a clearly defined zone, brightly illuminated relative to the outer portion of element $t$, is produced in the area of focal point $f^1$, and a further well defined and brilliantly illuminated zone is produced in the area of focal point $f^2$. Since the amount of light focused at the points $f$, $f^1$ and $f^2$ decreases toward the upper end of element $t$, in accordance with decrease in diameter thereof, the total area within element $t$ which is brilliantly illuminated relative to the remainder of this element decreases correspondingly and uniformly in cross section. As a result, there is produced within element $t$ an illuminated image I of this element located therein, spaced therefrom, this image being clearly defined and producing a flame-like effect. This will be understood from the above explanation and from Figure 5, in which latter figure the image is indicated in dotted lines. The shape of the image will depend in large measure upon the shape of the tip element, which may be varied as desired so long as the effect above described is produced.

The production of the illuminated image, of a shape substantially corresponding to that of the tip element, may advantageously be explained more in detail with reference to Figures 2, 3 and 4 of the drawing.

In Figure 2 the light rays totally reflected within element $t$ are indicated by the radii $2$—$f$ and the area which is brilliantly illuminated by the light focused at the point $f$ is indicated by the dotted circle I. In Figure 3 the light rays totally reflected within element $t$ are indicated by the radii $5$—$f^1$, and the area brightly illuminated by the rays focused at point $f^1$ is indicated by the dotted circle I. In like manner, in Figure 4 the radii $8$—$f^2$ indicate the light rays totally reflected within the element $t$ and focused at point $f^2$, the area brilliantly illuminated from the light rays focused at point $f^2$ being indicated by the dotted circle I. It will be clear from Figures 2, 3 and 4 that the amount of light focused on the axis $x$—$y$ decreases toward the upper end or tip of element $t$ and that the brilliantly illuminated area within this element correspondingly decreases in cross sectional area, the result being that the complete image produced by the brilliantly illuminated area within element $t$ approximately corresponds in shape to the latter, being disposed therein and spaced from the outer surface thereof.

Any suitable means may be provided for placing the rod in light-conducting relation to a light source for transmitting light rays through the rod and thence into the element $t$, in the manner above described. In Figure 5 I have shown, by way of example, one means of accomplishing this. A casing 10 of suitable material, preferably opaque, has mounted therein a socket 11 of known type which receives an incandescent electric light bulb 12, also of known type. Any other suitable light source may be disposed within the casing. Casing 10 is provided with a removable cover 13 having an opening therethrough which receives a flanged rubber bushing 14 through which fits snugly the lower end portion of rod $r$ of an artificial candle embodying my invention. Preferably, the lower end of rod $r$ is flat and normal to the axis of the rod, though it may be shaped in any other suitable manner within the broader aspects of my invention. The element $t$ is of greater diameter at its base portion than the rod $r$, being connected to the upper end of the rod by a rounded shoulder as previously described. The light rays from the source 12 pass upwardly through rod $r$, which rod and element $t$ may be illuminated slightly, due to internal reflection of rays which do not pass lengthwise through rod $r$ parallel to the axis thereof, imperfections in the glass, or other causes. However, such illumination of the rod and the tip member does not interfere with the production of the brilliantly illuminated image I in the manner previously described and, in certain respects, enhances the appearance of such image, since slight illumination of the tip element about the image I causes the latter to stand out clearly and enhances the flame effect.

In the modified form of candle illustrated in

Figure 6, the greatest diameter of tip element $t^1$ is at the base thereof and is the same as the diameter of rod $r^1$. An image I is produced in the tip element $t^1$ in the manner previously described but, due to the shape of this element, the image is more tapered and longer than image I of Figure 5 and has its lower end nearer the upper end of rod $r^1$, since the concaved surface of tip element $t^1$ extends to the upper end of the rod $r^1$, as will be understood from the preceding description.

In Figure 1, $Cb$ and $Ch$ are secondary axes of the surface or arc AB and define the length thereof, and $C'p$ and $C'm$ are secondary axes of the surface or arc $A'B'$, as will be understood.

I claim:

1. As an article of manufacture, an artificial candle member comprising an integral cylindrical glass rod and a tip portion at one end thereof formed of crown glass having a predetermined critical angle, said rod being adapted for positioning with respect to a light source to receive axially directed light rays through the opposite end thereof, said tip portion being of generally conical form with a concave lateral surface so shaped and disposed that light rays entering said tip portion from said rod in a direction parallel with the axis of said rod are caused to be totally reflected to produce an apparent brilliantly illuminated reduced image of said tip portion within said tip portion.

2. As an article of manufacture, an artificial candle member comprising a rod of transparent light transmitting material, a tip portion at one end thereof of a generally conical form with its base of greater diameter than said rod and with the lateral surface thereof defined by a generatrix of concave curvature, said member being formed of material of a predetermined critical angle and the tip portion being so shaped and disposed that light rays transmitted through said rod parallel to the axis thereof will strike said surface at an angle to the normal greater than said critical angle and will be totally reflected to produce a brilliant image of said tip portion within the same.

3. As an article of manufacture, an artificial candle comprising an elongated rod of transparent light transmitting material having a flat end surface adapted to receive light rays from a light source and to transmit said rays through said rod parallelly to the axis thereof, a tip portion at the other end of said rod of generally conical shape, said tip portion being of material having a predetermined critical angle, and the lateral surface thereof being concaved for the major portion of its length on an arc of regular curvature and of such radius that the parallel light rays from said rod strike said surface at an angle to the normal greater than said critical angle to cause said rays to be totally reflected and focused along the axis of said tip portion whereby an intensified image of said tip portion is reproduced axially therein and spaced inwardly of the lateral surface of said tip portion.

JOHN FREI, Jr.